United States Patent [19]

Engel et al.

[11] Patent Number: 4,817,574

[45] Date of Patent: Apr. 4, 1989

[54] FEED SYSTEM FOR INJECTION NOZZLES

[75] Inventors: Gerhard Engel; Thomas Kütner; Rolf Stünkel, all of Stuttgart; Rolf Wessel, Oberriexingen, all of Fed. Rep. of Germany

[73] Assignee: Robert Bosch GmbH, Stuttgart, Fed. Rep. of Germany

[21] Appl. No.: 66,358

[22] PCT Filed: Jun. 20, 1986

[86] PCT No.: PCT/DE86/00257

§ 371 Date: Aug. 4, 1987

§ 102(e) Date: Aug. 4, 1987

[87] PCT Pub. No.: WO87/02418

PCT Pub. Date: Apr. 23, 1987

[30] Foreign Application Priority Data

Sep. 10, 1985 [DE] Fed. Rep. of Germany ....... 3536034

[51] Int. Cl.$^4$ .................... F02D 41/34; F02D 41/36
[52] U.S. Cl. .................... 123/494; 123/414; 123/478
[58] Field of Search ............ 123/414, 494, 617, 357, 123/490, 478; 73/116, 119 A

[56] References Cited

U.S. PATENT DOCUMENTS

| 4,407,155 | 10/1983 | Sundeen | 73/116 |
| 4,434,770 | 3/1984 | Nishimura et al. | 123/494 |
| 4,442,822 | 4/1984 | Kondo et al. | 123/617 X |
| 4,471,653 | 9/1984 | Kawamura et al. | 123/612 X |

FOREIGN PATENT DOCUMENTS 113553 7/1984 European Pat. Off. ............ 123/490

Primary Examiner—Tony M. Argenbright
Attorney, Agent, or Firm—Michael J. Striker

[57] ABSTRACT

A system for controlling injection time points and quantity of the fuel injection in a self-igniting internal combustion engine includes a transmitter of reference pulses (R) coupled to a crankshaft and a transmitter of speed pulses (D) and of a synchronizing pulse coupled to the camshaft. From the distance of two speed pulses immediately preceding a reference pulse, a measuring interval and instantaneous angular speed are determined. The injection time point is computed as a function of the instantaneous angular speed and of engine variables. By means of the synchronizing pulse, the measuring section and the reference pulse are assigned to a corresponding cylinder.

14 Claims, 3 Drawing Sheets

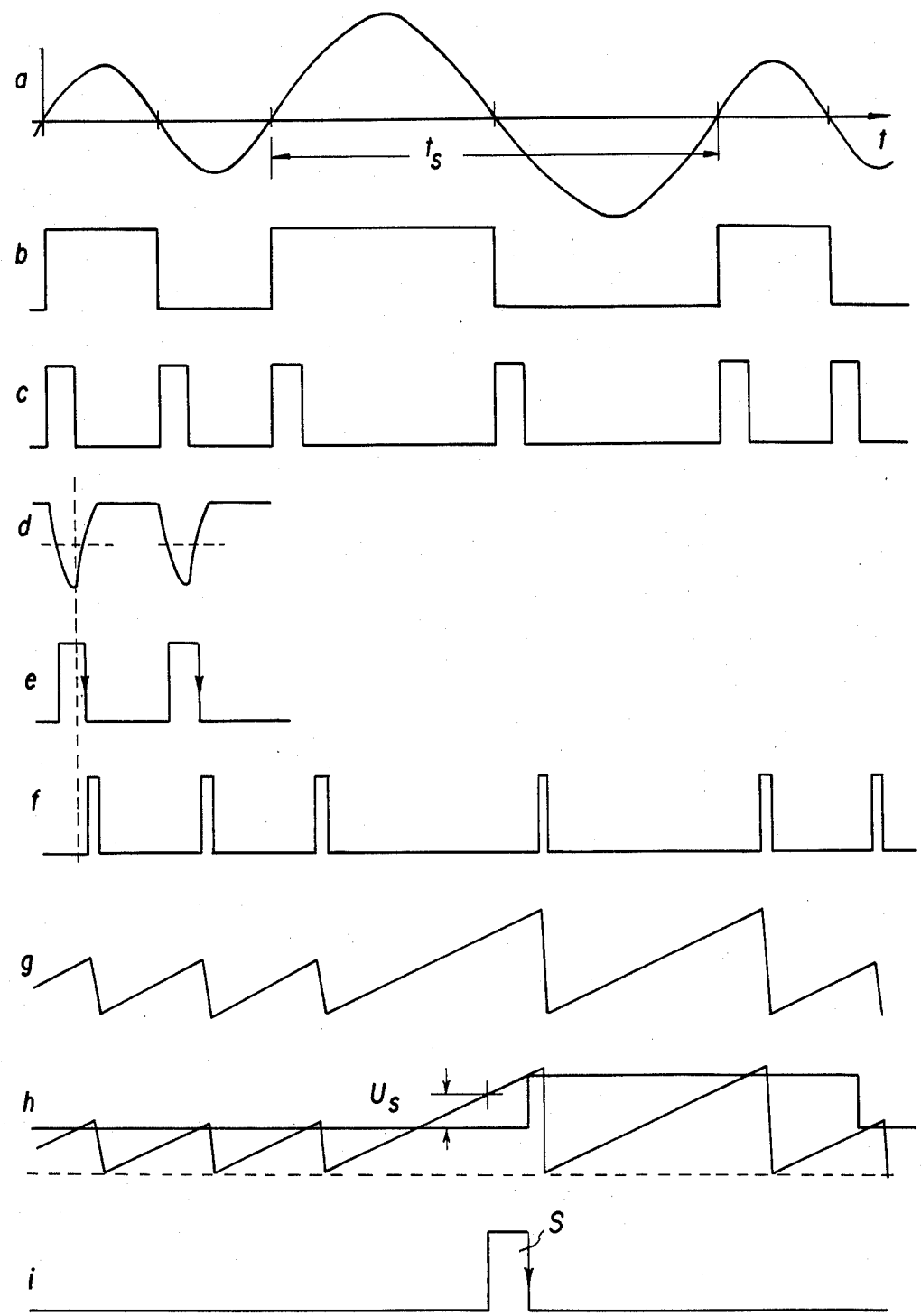
FIG. 3 a-i

FEED SYSTEM FOR INJECTION NOZZLES

BACKGROUND OF THE INVENTION

The invention relates to a feed system for injection nozzles. In order to control the commencement of injection and the amount of fuel injected, which can also be determined by the injection duration, feed systems are known for internal combustion engines, which feed systems use speed transmitters, which are connected with the crankshaft and the camshaft, in order to determine the engine speed. The respective engine speed is fed to a computer which determines the commencement of the injection process and the injection quantity in connection with other parameters for the different cylinders. In order that the engine can be operated in an optimal manner at different speeds and under different operating conditions, it is necessary to determine the commencement of injection and the injection quantity as accurately as possible as a function of data relating specifically to the engine and of the respective operating conditions. Special synchronizing transmitters are required for this purpose in known arrangements which ensure that the different cylinders are injected with fuel in the correct sequence and at the correct time. A relatively great expenditure is required in this case because of the additionally required transmitters.

SUMMARY OF THE INVENTION

It is an object of the present invention to provide a feed system which has the advantage that a single pulse transmitter can suffice for determining the speed and for synchronization, which pulse transmitter sends a pulse train with pulse intervals which vary at least partly in magnitude. For example, an inductive transmitter in conjunction with a toothed gear, which is arranged on the crankshaft or camshaft, can be used as a pulse transmitter. The toothed gear can comprise an additional tooth or tooth gap as a synchronizing mark which procudes a pulse interval diverging from the rest of the pulses at the corresponding place in the pulse train. This asymmetry and, accordingly, the synchronizing mark can be detected with a suitable evaluating circuit and can be fed to the engine control together with speed pulses. In order to determine the commencement of injection and the injection quantity, which can be determined by the injection duration, as accurately as possible the instantaneous speed is determined within as short a time as possible before the commencement of injection. Accordingly, speed fluctuations, which are brought about by changes in load or other influences, can only cause a deviation from the calculated speed and the actual speed at the moment of the commencement of injection to a very limited extent.

In the feed system, according to the invention, a pulse transmitter can also be arranged on the camshaft and/or the crankshaft for providing reference pulses and speed pulses. In order to determine the commencement of injection, it can be advisable to arrange a corresponding pulse transmitter on the crankshaft, while a suitable pulse transmitter can be connected with the camshaft in order to determine the instantaneous speed. However, depending on the use, a single pulse transmitter can also be sufficient for determining the instantaneous speed and the commencement for injection. A pulse transmitter coupled with the crankshaft can generate reference pulses in accordance with which the fuel injection commences at a delay time which is a function of the speed and the characteristic field. The delay time is calculated by the engine control.

The pulse train, which is generated by a pulse transmitter in connection with a toothed gear, contains a synchronizing oscillation, which is generated by means of the synchronizing mark—tooth gap or additional tooth—and a speed oscillation produced by the rest of the teeth. The period of the synchronizing oscillation produced by means of the synchronizing mark is preferably twice that of the speed oscillation. Accordingly, a continuous transition from the synchronizing oscillation to the speed oscillation is achieved. It is advantageous to select the number of teeth without a synchronizing mark in such a way that it amounts to a whole-number multiple of, and at least three times the quantity of cylinders.

If a relatively high number of teeth is used, the onboard calculator or engine control, respectively, can be relieved in that not all the teeth are constantly evaluated in the computer after a completed synchronization; rather, the teeth are evaluated only in the area of the reference pulse for determining the speed and for establishing any changes. For example, the spacing between two teeth prior to the reference pulse can be used for determining the instantaneous speed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 3a–i show different signals occurring in the evaluating circuit shown in FIG. 2.

DETAILED DESCRIPTION OF THE PREFERRED EMBODIMENTS

Figure 1:
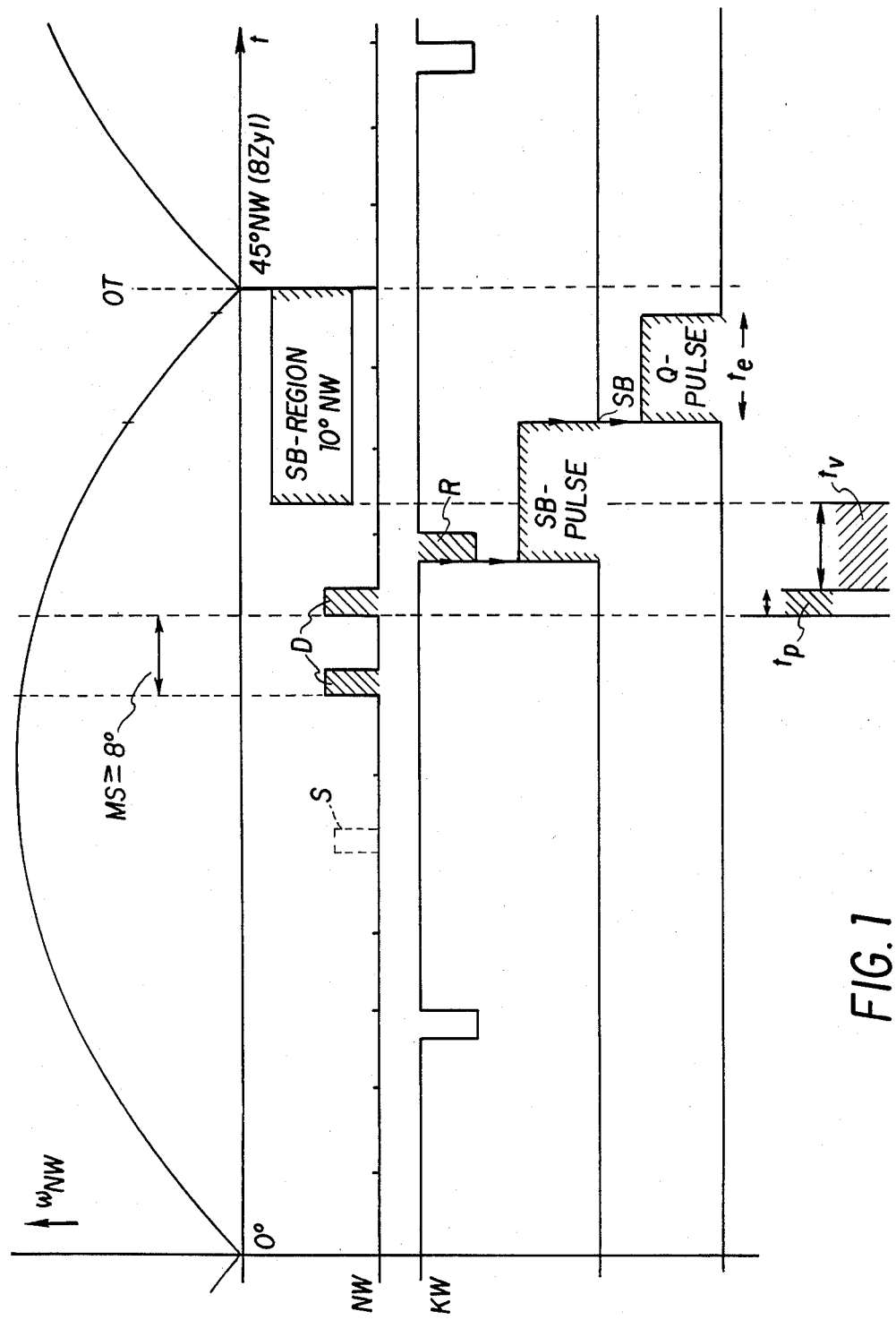
FIG. 1 shows the time curve of the angular velocity of the cam shaft and respective pulse diagrams.

In the diagram shown in FIG. 1 the time curve of the angular velocity $\omega_{NW}$ of the camshaft of an eight-cylinder engine is indicated at the top. The upper dead center OT, where the angular velocity $\omega_{NW}$ reaches a minimum, is at 45°.

Below this is a portion of the pulse train with the same time axis, the pulse train being produced by a speed transmitter connected with the camshaft NW. The time interval MS between the two pulses D shown here serves as a measuring section for the instantaneous speed. This measuring section corresponds to an angle of rotation of the camshaft which is greater than or equal to 8°.

A pulse transmitter connected with the crank shaft KW produces the pulse train designated by KW, wherein the pulse R, which occurs immediately after the pulses D serving for the determination of the instantaneous speed, is produced by a reference mark provided at the pulse transmitter of the crankshaft. The pulse R can therefore also be designated as reference pulse with which the commencement of the fuel injection is brought about so as to be delayed in time. The delay and, accordingly, the actual commencement of injection SB, are determined by means of a SB pulse which is calculated by the engine control from the respective operating status and as a function of data relating to the engine. At the end of the SB pulse, the Q pulse determining the injection quantity Q is produced. The injection quantity Q is a function of the injection duration $t_e$.

The allocation in time of the speed pulses D and the reference pulse R must be selected in such a way that the required program running time $t_p$ of the computer and the time lag $t_v$ occurring because of the elasticity between the crankshaft and the camshaft ensure a prompt determination of the injection quantity and the commencement of injection under every operating condition. The commencement of injection SB can be in the range of 10° before the upper dead center OT.

The separate determination of the commencement of injection and the injection quantity is preferably effected from the respective instantaneous speed and from characteristic diagrams relating specifically to the engine. In the preferred embodiment, the instananeous speed is measured at the camshaft NW and the reference pulse R is produced by means of a pulse transmitter arranged at the crankshaft KW. However, in principle, one pulse transmitter can also be used jointly for determining the instantaneous speed and as a reference mark for the commencement of injection. Such a pulse transmitter can consist substantially of a toothed gear, which is connected with the camshaft or the crankshaft, whose teeth produce a pulse train in an inductive sensor. Synchronizing marks, which occur in the pulse train as corresponding synchronizing oscillations or pulses S, can be arranged at the toothed gear by means of a partially asymmetrical arrangement of the teeth or by means of teeth which are additionally arranged on gaps or by means of omitted teeth.

Figure 2:
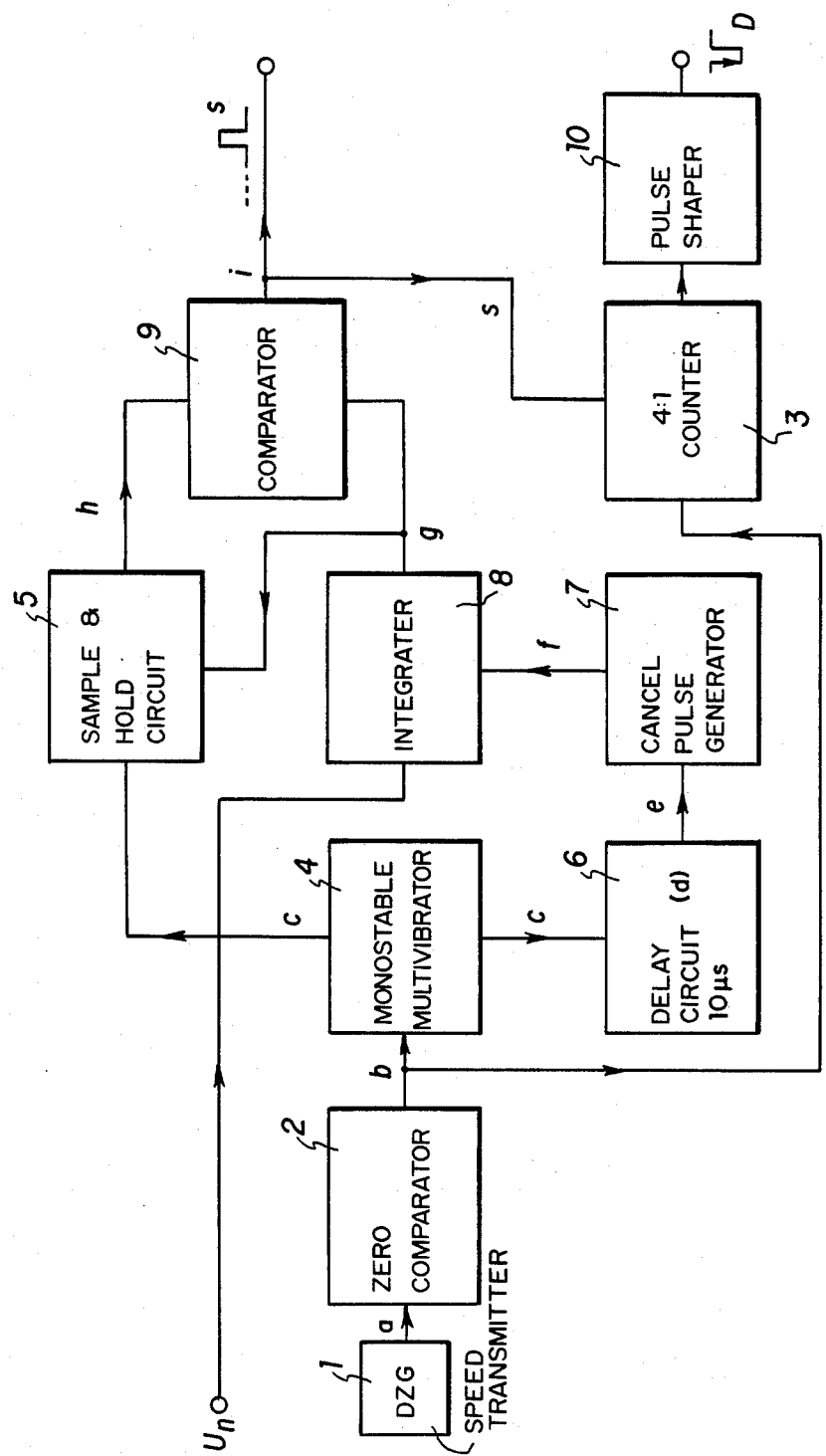
FIG. 2 shows an evaluating circuit for the pulses sent by the speed transmitter.

FIG. 2 shows an evaluating circuit which detects the speed-pulses D and synchronizing pulses S contained in a pulse train and sends them separately at the output side to the computerized motor control, not shown. The respective diagrams of different signals which occur in the circuit shown in FIG. 2 are indicated in FIG. 3.

The speed transmitter 1 containing the toothed gear and an inductive sensor sends its output signal a to a zero comparator 2 which is connected at the output side with a counter 3 and a monostable multivibrator 4. The signal b is fed to the counter 3 and the monostable multivibrator 4. At every flank on the input side, the monostable multivibrator produces pulses with a pulse duration of 30 $\mu$s, which are fed to a sample-and-hold circuit 5 and a delay circuit 6. The output of the delay circuit 6 is connected with the input of a cancel pulse generator 7 which supplies cancel pulses to an integrator 8 corresponding to the voltage curve f (FIG. 3). These cancel pulses set the output signal g of the integrator 8 to zero so that its output voltage increases linearly again. The output signal g is accordingly a sawtooth signal whose steepness is a function of the voltage $U_n$ applied at the input of the integrator 8. The voltage $U_n$ is a direct current voltage which is proportional to the speed.

The pulses supplied by the monostable multivibrator 4 and the sample-and-hold circuit 5 are transfer pulses which cause the instantaneous voltage value of the sawtooth voltage g to be stored temporarily in the circuit 5 and fed on the output side to an input of a comparator 9. The delay circuit 6 ensures that the cancel pulse sent by the cancel pulse generator 7 occurs later than the transfer pulse transmitted by the monostable multivibrator 4 to the sample-and-hold circuit 5. The voltage value temporarily stored in the sample-and-hold circuit 5 is now compared in the comparator 9 with the following sawtooth of the sawtooth voltage g. If the sawtooth voltage g exceeds the previously stored value by a predetermined voltage threshold $U_S$, a pulse which represents the synchronizing pulses, is generated at the output i of the comparator 9.

With the synchronizing pulse, the counter 3 is simultaneously reset to zero, so that it is accordingly synchronized. The speed pulses D contained in the voltage curve b are counted in the counter 3, which is likewise set to zero automatically, for example, during overflow. The counter 3 can accordingly act as a 4:1 divider, for example. In the preferred embodiment a pulse shaper 10 is connected downstream of the counter 3, in addition, in order to reshape the speed pulses, if necessary, into suitable pulses for further processing in a non-illustrated computerized evaluation circuit.

The automatic resetting of the counter, for example, after the arrival of four speed pulses D, ensures that this counter is also reset if the synchronizing pulse S should fail because of interference.

The different signal curves a to i are shown in corresponding figures 3a to 3i with a common time axis t.

The speed signal a is shown in the area where a synchronizing oscillation of duration $t_s$ occurs. The rest of the oscillations are speed oscillations. The zero comparator 2 derives speed pulses and synchronizing pulses from these oscillations, the monostable multivibrator 4 produces pulses with a duration of 30 $\mu$s, for example, at each flank of these pulses. Voltage curves corresponding to FIGS. 3d and e occur in the delay circuit 6 in connection with an integrating circuit. The cancel pulse generator 7 produces cancel pulses according to signal curve f at the back flank of the delayed pulses according to signal curve e. The output voltage of the integrator 8 corresponds to the curve g, since this voltage is set to zero during every cancel pulse. The comparator 9 produces the synchronizing pulse S, according to voltage curve i, when a predetermined voltage threshold $U_S$ (FIG. 3h) is exceeded.

We claim:

1. A system for controlling the commencement (SB) of injection and the injection quantity for cylinders of a self-ignition internal combustion engine having a camshaft, a crankshaft, and means for sensing operational variables of the engine, comprising a reference pulse transmitter coupled to said crankshaft to generate a succession of reference pulses (R) to which the commencement of the fuel injection is related; a speed pulse transmitter coupled to said camshaft to generate during each engine cycle a succession of speed pulses (D) and a synchronizing pulse (S); means for separating said speed pulses from said synchronizing pulse; and a computerized evaluation means having inputs connected to said sensing means, said reference pulse transmitter and to said separating means to compute in dependence on a distance between two consecutive speed pulses (D) immediately preceding a reference pulse (R) and on the engine variables an injection commencement point (SB), and further determining from said distance and said synchronizing pulse a cylinder pertaining to said commencement point.

2. A system as defined in claim 1 wherein said evaluation means determines from said distance an instantaneous angular velocity.

3. A system as defined in claim 2 wherein said distance corresponds to a measuring section pertaining to one of said cylinders.

4. A system as defined in claim 3 wherein said separating means includes a counter for counting said speed pulses, and a comparator for separating said synchronizing pulses, and said counter being reset by each synchronizing pulse to assign said measuring section to a corresponding cylinder.

5. A system as defined in claim 4 wherein said comparator compares a signal generated by said speed pulse transmitter to a single threshold ($U_S$), and generates a synchronizing pulse when said threshold is exceeded.

6. A system as defined in claim 5 wherein said threshold is switchable.

7. A system as defined in claim 6 wherein said synchronizing pulse is generated at the maximum of an instantaneous angular velocity.

8. A system as defined in claim 3 wherein said reference pulse transmitter generates a succession of reference pulses corresponding to a multiple of the number of cylinders, said injection commencement point (SB) occurring at a time delay after a determined reference pulse pertaining to a cylinder, said time delay being computed by said evaluation means as a function of said instantaneous angular velocity and a field of engine characteristics.

9. A system as defined in claim 3 wherein said spaced pulse transmitter includes a toothed gear fixed on the camshaft and a sensor for sensing the teeth of said gear, said gear having an additional mark to produce during each revolution of the camshaft said synchronizing pulse.

10. A system as defined in claim 9 wherein said additional mark is an additional tooth gap for producing a synchronizing oscillation having a period twice as long as that of speed oscillations produced by the teeth of said toothed gear.

11. A system as defined in claim 10 wherein the number of said teeth is an integer multiple of the quantity of cylinders of the engine.

12. A system as defined in claim 10 wherein after each synchronizing pulse the synchronization is checked by means of an evaluation of said speed pulses immediately following said synchronizing pulse.

13. A system as defined in claim 4 wherein said synchronizing pulse is fed to said computerized evaluation means for further processing.

14. A system as defined in claim 9 wherein said additional mark is located asymmetrically between two teeth of said toothed gear.

* * * * *